Patented Feb. 6, 1940

2,189,337

UNITED STATES PATENT OFFICE 2,189,337

CELLULOSE DERIVATIVE COMPOSITIONS

Shailer L. Bass, Toiva A. Kauppi, and Frank B. Smith, Midland, Mich., assignors to The Dow Chemical Company, Midland, Mich., a corporation of Michigan No Drawing. Application October 3, 1938, Serial No. 233,024

10 Claims. (Cl. 134—79)

This invention relates to cellulose derivative compositions and particularly to compositions plasticized with certain hydroaromatic-substituted aryl ethers.

It is the practice to modify the extensibility of cellulose derivatives and other plastics by incorporating therein high-boiling compounds of low volatility, ordinarily referred to as plasticizers. The usual plasticizers modify the properties of the original plastic, especially the hardness, flexibility, and toughness of articles producible therefrom. Those plastics which are intended for molding purposes are made to flow more readily under molding pressures by the inclusion therein of the usual plasticizers, and the temperature required to produce a satisfactory plastic flow is reduced. The desirable properties contributed to a plastic by the addition of a plasticizer are usually attained at the expense of the hardness of the product at room temperature since most plasticizers have a noticeable softening effect. The amount of softening contributed by a plasticizer varies with the particular plasticizer employed, the amount of plasticizer relative to the amount of plastic material, and with the particular combination of plasticizer and plastic.

The softening and weakening effect of plasticizers becomes more pronounced as the proportion of plasticizing agent is increased. It becomes necessary therefore to exercise care in selecting a plasticizer which will have the desired effect on the cellulose derivative, i. e., to increase the pliability, elasticity, ductility, or moldability thereof without excessively softening or weakening the product.

Among the desirable properties of a plasticizer are: low volatility, so that it does not evaporate from the plasticized composition on aging or at molding temperatures; resistance to attack by water, acids, and alkalies; insolubility in oils and greases; resistance to yellowing on exposure to sunlight; and, plastics containing the plasticizer should retain flexibility at low temperatures. In many instances, lack of toxicity and freedom from odor or taste are important attributes of a plasticizer. Some, but not all, of these properties are enjoyed by most plasticizers. Few, if any, of the known plasticizers contribute all of the desired properties to a cellulose derivative composition, and it is particularly noticeable that none of the plasticizers provide a cellulose derivative composition which retains most of its hardness, while at the same time increasing toughness, flexibility, and dielectric properties.

In recent years, ethyl cellulose has become a commercially important ingredient of plastics and coating compositions. This material is inherently softer, tougher, and more extensible than the cellulose esters, such as, for example, nitrocellulose and cellulose acetate. Ethyl cellulose is also more generally compatible with the customary plasticizers than are the other cellulose derivatives. The principal problem, in the preparation of ethyl cellulose plastics having practical flow characteristics and which are more highly flexible than the ethyl cellulose alone, is to produce a composition of sufficient toughness and flexibility at room temperature to meet the demands of service without, at the same time, unduly softening the plastic. A plasticizer must be added, however, in order to modify the molding characteristics of the ethyl cellulose to such an extent that it may be deformed readily under moderate pressures and at moderately elevated temperatures. The same statement is true in general of the other cellulose ethers and particularly the lower alkyl ethers of cellulose. The problem of plasticizing benzyl cellulose is similar to that of ethyl cellulose but is more difficult due to the inherent greater softness of benzyl cellulose and to its tendency to be further softened and weakened by the addition of the usual plasticizers.

It must be remembered that the hardness, toughness, and extensibility desired in cellulose derivative compositions is largely determined by the use to which such compositions may be put. Plastics for injection molding must flow well at molding temperatures but should harden rapidly at lower temperatures. They should be hard enough when cold to withstand scratching, and tough enough to withstand shock. Plastics for extrusion coating of wire, for example, must flow well, have high flexibility at all temperatures met with in service, and be sufficiently hard and tough to withstand abrasion. In addition, the composition must provide good electrical insulation. Similarly, lacquer coatings must be hard, tough, and possess elastic extensibility to prevent cracking. In addition, retention of flexibility on exposure to light and heat is desirable. Fabric coatings should be flexible, hard, glossy, and free from tackiness and be resistant to discoloration by alkalies and detergents.

It is accordingly an object of the present invention to provide cellulose derivative compositions comprising a plasticizer which increases the toughness and flexbility of the cellulose derivative without unduly softening the same. It is another object of the invention to provide new plastic compositions, comprising cellulose derivatives and such plasticizers, which have good strength characteristics and which are nearly as hard and in many instances harder than the cellulose derivative alone. It is a further object of the invention to provide cellulose derivative plastics having good flow characteristics, high degree of flexibility at all temperatures met with in service, and sufficient hardness and toughness to withstand abrasion. It is a further object to provide such a composition having good electrical insulation properties. It is another object of the invention to provide such compositions which are flexible, hard, glossy, free from tackiness, and resistant to discoloration by alkalies and detergents, or on exposure to light. Other objects of the invention will become apparent as the description proceeds.

According to the present invention, the foregoing and related objects may be attained in a composition comprising a cellulose derivative plasticized with one or a combination of the substituted aryl ethers having the general formula:

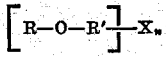

wherein R is an aryl group; R' is the same or a different aryl group selected from the class consisting of the phenyl, alkyl-phenyl, aralkyl-phenyl, and naphthyl radicals, and their halogen substitution products; X is a hydroaromatic radical selected from the group consisting of the cyclohexyl, alkyl cyclohexyl, dicyclohexyl, and aryl cyclohexyl radicals; and $n$ is a numeral from 1 to 6, inclusive, such that the mol ratio of hydroaromatic radicals to aryl ether residues is always greater than 1.5/1. The preferred compositions contain varying amounts of plasticizer, depending on the use requirements. Thus, molding plastics contain from 5 to 40 parts of the new plasticizer, per 100 parts of the cellulose derivative. Wire coating compositions, and those for the extrusion of flexible tubing, may contain up to about 100 parts of the plasticizer, per 100 parts of the cellulose derivative. Lacquer coatings may contain up to 100 or more parts of plasticizer, per 100 parts of the cellulose derivative.

Many of the hydroaromatic aryl ethers defined above are described in a co-pending application of one of the present inventors, Serial No. 192,857, filed February 26, 1938. Compounds having the foregoing general formula impart to cellulose derivative compositions an unusual combination of the desirable qualities of extensibility, hardness, toughness, and electrical insulation. They possess low toxicity to humans, and are characterized by an inertness to attack by most common chemicals with which such compositions may be brought in contact, and are resistant to discoloration by light. It is a further characteristic of the plasticizers to be employed in the compositions herein described that any desired degree of hardness may be imparted to a cellulose derivative composition by varying the number of hydroaromatic radicals substituted in the aryl ether.

Owing to slight variations in the compatibility of the new plasticizers in the cellulose esters, nitrocellulose, and the cellulose ethers, these various cellulose derivatives will be considered separately in the illustrative examples.

The plasticizers which we employ to produce our new compositions are prepared by the condensation of cyclohexene or substituted cyclohexenes with aryl ethers in the manner described in the aforesaid co-pending application. The properties of some of the products so formed are set forth in the following tables to provide a better understanding of the invention. Table I sets forth the properties of various fractions of cyclohexylated phenyl ether which we have found satisfactory for the present purpose. A few of the physical properties of cyclohexylated phenyl diphenyl ether which we have also used satisfactorily as a plasticizer for the cellulose derivatives are given in Table II. Table III sets forth some of the physical properties of cyclohexylated phenyl ether substitution products and substituted cyclohexene condensation products with phenyl ether which are hardening plasticizers for cellulose derivatives.

*Table I*

| Plasticizer No. | Average number cyclohexyl groups | Appearance | Boiling range, °C., pressure millimeters Hg | Specific gravity 60°/60° C. | Refractive index at 60° C. | Viscosity at 60°C. centipoises | Flash point, °C. | Fire point, °C. |
|---|---|---|---|---|---|---|---|---|
| 1 | 1 | Water-white mobile liquid | 205–230 at 20 | 1.0387 | 1.5693 | 8.2 | 171 | 196 |
| 2 | 1.4 | ...do... | 231–273 at 20 | 1.0346 | 1.5679 | 24.9 | 196 | 227 |
| 3 | 1.8 | Water-white viscous liquid | 273–300 at 20 | 1.0307 | 1.5662 | 207.5 | 218 | 263 |
| 4 | 2.75 | ...do... | 300 at 20 to 295 at 5 | 1.0285 | 1.5523 | 1138.0 | | 243 |
| 5 | 4 | Pale straw tacky resin | 295–330 at 5 | a1.0277 | 1.5530 | a344.0 | 252 | 313 |
| 6 | 6 | Yellow resin M. P. 35° | 295–310 at 1 | | | | | |
| 7 | 6 | Brown resin M. P. 50° | 310–340 at 1 | | | | | |
| 8 | (*) | Pale straw viscous liquid | Above 205 at 20 | b1.0434 | b1.5680 | | | |
| 9 | (*) | Straw-colored viscous liquid | Above 230 at 20 | b1.0434 | b1.5680 | | | |

Note.—a at 98.9° C.; b at 25° C.

*No. 8—Undistilled crude mixture with phenyl ether removed. No. 9—Undistilled crude mixture with phenyl ether and mono-cyclohexyl fraction removed.

*Table I (continued)*

| Plasticizer No. | 10³ cycle electrical properties, room temp. | | | | | 10⁶ cycle electrical properties, elevated temp. | | | | |
|---|---|---|---|---|---|---|---|---|---|---|
| | Dielectric constant | Power factor, percent | "Q" factor* | D. C. resistance | Temp., °C. | Dielectric constant | Power factor, percent | "Q" factor* | D. C. resistance | Temp., °C. |
| 1 | 3.11 | 0.008 | 12,500 | $6.3 \times 10^{12}$ | 26 | 2.94 | 0.103 | 970 | $8.5 \times 10^{11}$ | 58 |
| 2 | 3.08 | 0.005 | 20,000 | $2.3 \times 10^{13}$ | 24 | 2.87 | 0.17 | 588 | $8.2 \times 10^{11}$ | 67 |
| 3 | 2.95 | | | | 23 | 2.77 | 0.01 | 10,000 | $1.7 \times 10^{13}$ | 63 |
| 4 | 2.86 | | | | | 2.78 | 0.013 | 7,700 | $2.0 \times 10^{13}$ | 63 |
| 5 | 2.36 | | | | | 2.63 | 0.065 | 1,540 | $>10^{15}$ | 66 |
| 6 | 2.46 | 0.040 | 2,500 | | 25 | 2.63 | 0.023 | 4,350 | $>6 \times 10^{14}$ | 103 |
| 7 | 2.44 | 0.019 | 5,260 | | 23 | 2.60 | 0.101 | 990 | $>6 \times 10^{14}$ | 101 |

* "Q" factor is reciprocal of power factor, useful for comparison of data in high frequency tests.

Table II

| Plasticizer No. | Plasticizer name | Average number of cyclohexyl groups per molecule | Boiling range, °C. at mm. Hg | Density | Refractive index | Physical form |
|---|---|---|---|---|---|---|
|  | o-Phenyl diphenyl ether * |  | 197–198 at 7.5 |  | 1.6288 at 26° | White crystals, M. P. 40° C. |
| 10 | Cyclohexyl phenyl di-phenyl ether. | 1.5 | 252–280 at 20 | 1.0813 25°/25° | 1.6054 at 25° | Pale yellow viscous liquid with blue fluorescence. |
| 11 | do | 1.5 | 281–300 at 20 | 1.0774 35°/35° | 1.6060 at 25° | Do. |
| 12 | do | 1.5 | 300–325 at 20 | 1.0627 60°/60° | 1.5956 at 35° | Deep yellow, very viscous liquid. |
| 13 | do | 3 | 230–300 at 5 | 1.0562 80°/80° | 1.5809 at 60° | Light brown, sticky resin with blue flourescence. |
| 14 | do | 3.5 | 280–300 at 2 | 1.0456 90°/90° | 1.5768 at 60° | Do. |

* o-Phenyl diphenyl ether included for comparison.

Table III

| Plasticizer No. | Plasticizer name | Degree of substitution | Viscosity, cps. at 60° C. | Boiling range, °C. at mm. Hg | Density | Refractive index 60° C. | Physical form |
|---|---|---|---|---|---|---|---|
| 15 | Cyclohexyl chlorophenyl ether | 3+ |  | 195–210 at 5 |  |  | Light yellow viscous liquid. |
| 16 | Cyclohexyl mono paratertiary butyl phenyl ether. | 2+ | 1878 | >180 at 2.5 | 1.015 $\frac{100°}{100}$ C.<br>1.021 $\frac{60°}{60}$ C. | 1.5485 | Light yellow tacky resin. |
| 17 | Cyclohexyl alpha-naphthyl phenyl ether. | Mixed | 2040 | >210 at 20 | 1.071 $\frac{100°}{100}$ C.<br>1.074 $\frac{60°}{60}$ C. | 1.5968 | Light yellow viscous fluorescent liquid. |
| 18 | Di-(phenyl cyclohexyl) phenyl ether. | 2+ | 3800 | >200 at 20 | 1.055 $\frac{100°}{100}$ C.<br>1.056 $\frac{60°}{60}$ C. | 1.6039 | Red brown fluorescent tacky resin. |
| 19 | Di-(3-cyclohexyl cyclohexyl) phenyl ether. | 2+ | 401 | >200 at 20 | 0.996 $\frac{100°}{100}$ C.<br>0.997 $\frac{60°}{60}$ C. | 1.5583 | Red brown viscous liquid. |
| 20 | Di-(3-methyl cyclohexyl) phenyl ether. | 2+ | 539 | >160 at 20 | 1.062 $\frac{100°}{100}$ C.<br>1.064 $\frac{60°}{60}$ C. | 1.5480 | Dark brown viscous liquid. |

The twenty plasticizers listed in Tables I–III, inclusive, all comprise one or more hydroaromatic substituted aryl ethers conforming to the general formula given above, and all of those which contain more than 1.5 hydroaromatic groups substituted in the aryl ether residue have been found useful as plasticizers for the various types of cellulose derivatives encompassed in the classes generally referred to as nitrocellulose, cellulose esters, and cellulose ethers. The effect of the various plasticizers upon the cellulose derivatives has been evaluated in the method described by two of the present inventors in Industrial and Engineering Chemistry, 29, 678 (1937).

Table IV illustrates the effect of plasticizers 1–9, inclusive, upon a standard water-insoluble ethyl cellulose having 48.5 per cent ethoxyl content and a viscosity of 75 centipoises when dissolved to form a 5 per cent solution in a solvent consisting of 80 parts of toluene and 20 parts of ethanol by volume. The properties recorded in Table IV were all determined on ethyl cellulose composition films cast from a 15 per cent solution in the 80–20 toluene-ethanol mixture just described. For purposes of comparison, Table IV includes the corresponding data on ethyl cellulose films plasticized with certain well known plasticizers, namely, diphenyl phthalate, tricresyl phosphate, dibutyl phosphate, dibutyl phthalate, and castor oil.

Table IV

| Plasticizer No. | 100 ethyl cellulose, 15 plasticizer | | | | 100 ethyl cellulose, 40 plasticizer | | | |
|---|---|---|---|---|---|---|---|---|
|  | Yield point, kg./cm.² | Tensile strength, kg./cm.² | Elongation, percent | Hardness index | Yield point, kg./cm.² | Tensile strength, kg./cm.² | Elongation, percent | Hardness index |
| 1 | 340 | 445 | 29 | 72 | 135 | 155 | 35 | 28 |
| 2 | 395 | 420 | 33 | 83 | 130 | 255 | 53 | 27 |
| 3 | 555 | 610 | 26 | 117 | 350 | 395 | 23 | 74 |
| 4 | 505 | 650 | 34 | 106 | 205 | 340 | 46 | 43 |
| 5 | 630 | 630 | 10 | 133 | 525 | 525 | 7 | 110 |
| 6 | 705 | 705 | 6 | a148 | 690 | 690 | 4 | a145 |
| 7 | 675 | 675 | 5 | a142 | 605 | 605 | 4 | a127 |
| 8 | 455 | 580 | 32 | 96 | 170 | 290 | 40 | 36 |
| 9 | 450 | 550 | 28 | 95 | 185 | 285 | 40 | 39 |
| Blank (no plasticizer) | 475 | 630 | 30 | 100 | 475 | 630 | 30 | 100 |
| Diphenyl phthalate | 380 | 535 | 35 | 80 | 170 | 254 | 48 | 36 |
| Tricresyl phosphate | 320 | 525 | 46 | 67 | 100 | 130 | 36 | 21 |
| Dibutyl phthalate | 270 | 390 | 35 | 57 | 82 | 82 | 24 | 17 |
| Castor oil | 360 | 580 | 45 | 76 | 95 | 168 | 50 | 20 | a Calulated from load at braking point.

The data in Table IV show that the introduction of 1 or 2 cyclohexyl groups into phenyl ether produces plasticizers which, in low concentrations, modify the properties of ethyl cellulose in a manner similar to that of tricresyl phosphate or diphenyl phthalate. Of the plasticizers shown in Table I, numbers 3—9 are preferred in the compositions of Table IV. In these plasticizers, the mol ratio of cyclohexyl groups to phenyl ether is greater than 1.5/1. It is observed further that higher degrees of cyclohexylation of phenyl ether, e. g. to the tri-, tetra-, and hexa-cyclohexyl compounds, produce plasticizers which, at low concentrations, impart a hardness to the film approximately equal to the hardness of many synthetic resins, but without diminishing the inherent flexibility of the ethyl cellulose. At higher concentrations in the ethyl cellulose film, the hexa-cyclohexyl phenyl ether, which is itself a tacky resin at ordinary temperatures, yields films of unexpected hardness but which possess sufficient flexibility to be practical for many uses. It is a common characteristic of the plasticizers herein under consideration that cellulose derivative compositions containing them in high concentration retain an unusual amount of hardness when the proportion of plasticizers is considered and compared with similar compositions containing the well known plasticizers. In all plasticizing concentrations, the new plasticizers provide compositions of improved dielectric properties as compared with the unplasticized cellulose derivatives.

Table V illustrates the effect of plasticizers 3, 4, and 5 on films of a medium viscosity benzyl cellulose. For purposes of comparison, similar properties are reported on the same benzyl cellulose plasticized with tricresyl phosphate and with dibutyl phthalate. The films used for test purposes, reported in Table V, were all cast from a solution of the benzyl cellulose composition in a solvent composed of 50 parts of toluene, 30 parts of butyl acetate, and 20 parts of ethanol, by volume.

ness index, when compared with benzyl cellulose compositions comprising tricresyl phosphate or dibutyl phthalate as typical plasticizers. The usual plasticizers cannot be incorporated in benzyl cellulose to the extent of 40 per cent based on the weight of the cellulose ether without providing a composition too soft to be commercially useful. Even small amounts of plasticizer unduly soften benzyl cellulose. Our new plasticizers, however, containing mixtures of mono- and di-cyclohexyl phenyl ether, di- and tri-cyclohexyl phenyl ether, and tri- and tetra-cyclohexyl phenyl ether, respectively, can all be satisfactorily employed at 15 per cent concentration, and all but the mixture containing the tetra-cyclohexyl compound can be employed in the 40 per cent concentration.

We have found, with respect to cyclohexylated phenyl ether, that it is not necessary in all cases to separate the condensation product into its constituent fractions. A satisfactory plasticizer is obtained by distilling the unreacted phenyl ether from the reaction product and without further distillation or separation utilizing the residual cyclohexylated phenyl ether compounds. A mixture of this type corresponds to plasticizer No. 8. Another satisfactory product which is particularly useful in connection with benzyl cellulose is obtained by distilling both the phenyl ether and the mono-cyclohexyl derivatives thereof from the crude reaction mixture, the balance constituting a product similar to plasticizer No. 9. The composite plasticizers represented by numbers 8 and 9, when mixed with cellulose derivatives, behave like combinations of plasticizers and resins, and, because of the toughness which they impart to the film as well as the improved electrical properties, are very desirable components of cellulose ether compositions.

Table VI illustrates the use of plasticizers 10-14, inclusive, (cyclohexylated phenyl diphenyl ether) in ethyl cellulose compositions. The ethyl cellulose employed was the same as that employed in Table IV. It is observed from Table VI that cyclohexylated phenyl diphenyl ether behaves in a manner very similar to the various plasticizers produced by cyclohexylating phenyl ether.

*Table V*

| Plasticizer No. | 100 benzyl cellulose, 15 plasticizer | | | | 100 benzyl cellulose, 40 plasticizer | | | |
|---|---|---|---|---|---|---|---|---|
| | Yield point, kg./cm.$^2$ | Tensile strength, kg./cm.$^2$ | Elongation, percent | Hardness index | Yield point, kg./cm.$^2$ | Tensile strength, kg./cm.$^2$ | Elongation, percent | Hardness index |
| Blank | 410 | 460 | 18 | 100 | 410 | 460 | 18 | 100 |
| 3 | 310 | 320 | 25 | 76 | 130 | 230 | 50 | 32 |
| 4 | 410 | 410 | 15 | 100 | 220 | 230 | 24 | 51 |
| 5 | 475 | 475 | 2 | 116 | Incompatible. | | | |
| Tricresyl phosphate | 170 | 190 | 32 | 41.5 | Too soft to handle. | | | |
| Dibutyl phthalate | 160 | 190 | 34 | 39 | Do. | | | |

It is observed in the foregoing table that benzyl cellulose plasticized with the cyclohexyl phenyl ether derivative retains a surprisingly high proportion of its original tensile strength and hard-

*Table VI*

| Plasticizer No. | 100 ethyl cellulose, 15 plasticizer | | | | 100 ethyl cellulose, 40 plasticizer | | | |
|---|---|---|---|---|---|---|---|---|
| | Yield point, kg./cm.$^2$ | Tensile strength, kg./cm.$^2$ | Elongation, percent | Hardness index | Yield point, kg./cm.$^2$ | Tensile strength, kg./cm.$^2$ | Elongation, percent | Hardness index |
| 10 | 430 | 600 | 35 | 91 | 190 | 365 | 48 | 40 |
| 11 | 470 | 640 | 34 | 99 | 220 | 380 | 41 | 46 |
| 12 | 525 | 685 | 35 | 110 | 315 | 415 | 29 | 68 |
| 13 | 580 | 675 | 30 | 122 | 450 | 520 | 24 | 95 |
| 14 | 635 | 690 | 28 | 134 | 630 | 640 | 15 | 133 |
| Blank | 475 | 630 | 30 | 100 | | | | |

That the substituted cyclohexene condensation products with phenyl ether are satisfactory plasticizers for ethyl cellulose is illustrated by reference to Table VII. The plasticizers therein employed are numbers 18, 19, and 20 from Table III. It is observed in Table VII that the plasticized ethyl cellulose films containing plasticizers 18, 19, and 20 are all harder than ethyl cellulose alone, are capable of substantially the same elongation as the unplasticized product, and have tensile strengths substantially as good, and in some cases better, than films of the unplasticized materials. When 40 per cent plasticizer is incorporated in the ethyl cellulose the hardness is slightly lower than that of the unplasticized product and, as is to be expected from the use of such a large proportion of plasticizer, tensile strength and yield point are somewhat decreased and the elongation characteristics are, in general, somewhat increased.

flexibility is imparted to the nitrocellulose. The present plasticizers, however, provide a flexible product of sufficient hardness so that the plasticized compositions are useful for coating compositions, insulation, and the like.

Cellulose acetate butyrate is reported in Table VIII plasticized with from 13 per cent to 40 per cent of plasticizers 3 and 4. The plasticized products are surprisingly strong as compared with the unplasticized ester and the retention of hardness exhibited by the plastic composition is evidence of their utility in various fields where the unplasticized ester would be too brittle for satisfactory use. Cellulose acetate propionate is incompatible with as much as 20 per cent of the plasticizers herein described. When less than 20 per cent of one of the present plasticizers is employed, however, the yield point remains substantially the same or is slightly increased over that of the unplasticized blank. Tensile strength and Table VII

| Plasticizer No. | 100 ethyl cellulose, 15 plasticizer | | | | 100 ethyl cellulose, 40 plasticizer | | | |
|---|---|---|---|---|---|---|---|---|
| | Yield Point, kg./cm.$^2$ | Tensile strength, kg./cm.$^2$ | Elongation, percent | Hardness index | Yield point, kg./cm.$^2$ | Tensile strength, kg./cm.$^2$ | Elongation, percent | Hardness index |
| 18 | 570 | 665 | 29 | 120 | 380 | 480 | 28 | 80 |
| 19 | 575 | 710 | 32 | 121 | 260 | 440 | 45 | 55 |
| 20 | 560 | 595 | 23 | 118 | 370 | 470 | 33 | 78 |
| Blank | 475 | 630 | 30 | 100 | 475 | 630 | 30 | 100 |

Table VIII

| Plasticizer No. | 13% plasticizer in film | | | | 20% plasticizer in film | | | | 40% plasticizer in film | | | |
|---|---|---|---|---|---|---|---|---|---|---|---|---|
| | Yield point, kg./cm.$^2$ | Tensile strength, kg./cm.$^2$ | Elongation, percent | Hardness index | Yield point, kg./cm.$^2$ | Tensile strength, kg./cm.$^2$ | Elongation, percent | Hardness index | Yield point, kg./cm.$^2$ | Tensile strength, kg./cm.$^2$ | Elongation, percent | Hardness index |
| NITROCELLULOSE | | | | | | | | | | | | |
| Blank | | | | | | 810 | 8 | 100 | | 810 | 8 | 100 |
| 3 | | | | | 690 | 720 | 15 | 85 | Incompatible. | | | |
| 4 | | | | | 740 | 760 | 12 | 91 | Do. | | | |
| CELLULOSE ACETOBUTYRATE | | | | | | | | | | | | |
| Blank | | 680 | 7 | 100 | | 680 | 7 | 100 | | 680 | 7 | 100 |
| 3 | | 630 | 6 | 92 | | 630 | 7 | 92 | 340 | 370 | 20 | 50 |
| 4 | | 630 | 6 | 92 | | 550 | 5 | 81 | | 300 | 3 | 44 |
| CELLULOSE ACETOPROPIONATE | | | | | | | | | | | | |
| Blank | 660 | 700 | 12 | 100 | Incompatible | | | | Incompatible. | | | |
| 3 | 620 | 660 | 14 | 94 | do | | | | Do. | | | |
| 4 | 700 | 720 | 15 | 106 | | | | | | | | |
| 5 | 700 | 760 | 8 | 114 | | | | | | | | |

The cyclohexylated aryl ethers and their substitution products have hereinbefore been shown as plasticizers for the cellulose ethers and particularly ethyl cellulose and benzyl cellulose. Table VIII illustrates the applicability of plasticizers 3, 4, and 5 to the preparation of plastic compositions comprising nitrocellulose, cellulose acetate butyrate, and cellulose acetate propionate. It is observed from Table VIII that nitrocellulose is not compatible with as much as 40 per cent of plasticizers 3 and 4 but that when up to 20 per cent of the plasticizer is employed, the elongation characteristics are improved while the hardness index remains substantially constant. Nitrocellulose is in itself one of the hardest of the cellulose derivatives, but in spite of this fact, the common plasticizers have a noticeable tendency to produce too soft a product when sufficient hardness index are relatively unaffected or are slightly improved and the plastic product is capable of substantially the same elongation as was the unplasticized ester. The greatest improvement in properties is displayed when plasticizers 4 and 5 are employed, indicating that from 2 to 4 cyclohexyl groups per molecule are most desirable in the preparation of plasticized mixed esters of cellulose. The compatibility of the new plasticizers with cellulose esters may be improved by mixing some of the present plasticizers with some of the common softening plasticizers, which serve as mutual solubilizing agents.

When ethyl cellulose in the reported compositions is replaced by other alkyl ethers of cellulose such as propyl cellulose, butyl cellulose, amyl cellulose, or the mixed lower alkyl ethers thereof, results are obtained similar to those reported for ethyl cellulose. Similarly, the benzyl cellulose reported herein may be considered representative of the various aralkyl cellulose ethers. In a general way the mixed organic esters of cellulose reported in Table VIII are representative of the large class of lower aliphatic esters of cellulose which, in an unplasticized condition, are frequently characterized by excessive brittleness and when plasticized with many of the usual plasticizers for cellulose derivatives tend to form products which are undesirably soft. It is to be understood that all of the cellulose derivatives contemplated by the present invention are those which are substantially completely soluble in the customary organic solvents for such materials. Such cellulose derivatives are the ones which are substituted by at least 2, and preferably about 2.2 to 2.6 etherifying or esterifying groups per C. unit.

All of the plasticizers herein reported have been hydrocarbon substituted aryl ethers. The hydroaromatic derivatives of halogenated aryl ethers, and other thermo-stable substitution products may be similarly employed. As one example of this class may be named the cyclohexylated chloro- and bromo-phenyl ethers.

Considerable utility can be inferred from the data hereinbefore given on film properties of cellulose derivatives plasticized with the hydro-aromatic-substituted diaryl ethers containing from 1-6 hydroaromatic radicals.

Additional utility of some of the new plasticizers is shown by the following examples:

A lacquer was prepared containing 100 parts of standard ethyl cellulose, having a tensile strength of 470 kilograms per square centimeter and capable of 4 per cent elongation, and 20 parts of a cyclohexyl phenyl ether fraction boiling in the range from 319° to 329° C. at 4 millimeters pressure and corresponding approximately to tetra-cyclohexyl phenyl ether. Films deposited by this lacquer having a thickness of 0.04 millimeter after having been dried for ½ hour at 70° C. and conditioned for 2 days at 25° C. and 50 per cent relative humidity, had a tensile strength of 590 kilograms per square centimeter and were still capable of 4 per cent elongation. This indicates that the highly cyclohexylated phenyl ethers are comparable with the best synthetic resins employed as hardening agents for cellulose ether films, and that the deposited films have a sufficiently high flexibility to be employed in coating compositions. The lacquer films were colorless, clear, hard and glossy, and provided an excellent hard, water-proofing finish on paper or cloth. These films exhibited no yellowing and developed no brittleness after 90 hours in a standard "fadeometer". The resin-like plasticizer employed in this example could be added to the ethyl cellulose to the extent of about 60 per cent and still produce haze-free films. The resin-modified films had good dielectric properties. Compounds of the type of hexa-cyclohexyl phenyl ether may be employed as resinous components, together with the lower cyclohexylated derivatives or with other plasticizers, in the customary manner, for the production of lacquers. The higher substitution products constitute the resinous component of the lacquer while the lower cyclohexylated products or the other plasticizers present provide the desired flexibility. For example, a composition comprising 70 parts of ethyl cellulose, 25 parts of mono-ortho-xenyl diphenyl phosphate, and 2.5 parts each of plasticizers 6 and 7 provided a highly flexible, non-tacky film of sufficiently low melting point to be employed as a heat-sealing adhesive, without at the same time softening the film to such an extent that it could not be satisfactorily employed for wrapping purposes. When a similar composition was made up without inclusion of plasticizers 6 and 7, it was found to be quite flexible but objectionably tacky.

When about 14 per cent of plasticizer 4 was incorporated in an ethyl cellulose foil and the resulting product was compared with a non-plasticized commercial foil, the dielectric properties were found to be substantially better in the case of the plasticized product than in the unplasticized ethyl cellulose. For example, the power factor of the plasticized product was only 1.25 per cent while that of the unplasticized ethyl cellulose varied from 1.7 to 2 per cent. The dielectric strength was increased from 2420 to 2650 volts per mil.

Similar advantages can be shown for the herein-described compositions for use as molding plastics. Where hardness and toughness are essential to provide resistance to abrasion and where a low softening point and high impact hardness must be combined in the same molding composition, it is found that the herein-described compositions are readily injection molded and have a sufficiently high heat distortion so that the molding operation may be effected at moderate temperatures and under moderate working pressures. The Shore scleroscope hardness of molding compositions comprising the new plasticizers varies from about 85 to about 90 while that of cellulose derivative compositions comprising the customary softening plasticizers in like quantities varies from about 60 to about 75.

The new compositions have been employed in the preparation of extruded coatings for use as wire insulation and in the preparation of extruded flexible articles such as tubing, and the like. One such composition which is satisfactory for the said purpose comprises 67.5 per cent of a high viscosity ethyl cellulose, 30.2 per cent of plasticizer 5, and 2.3 per cent of stearic acid. This composition when used as an extruded coating for wire gives a tough, highly flexible, water-resistant coating having good electrical properties. It has a Shore hardness greater than 80, a tensile strength of 370 kilograms per square centimeter, an elongation of 21 per cent, and a moisture permeability of only 263 grams per square meter per day. The coating has an insulation value greater than 500 megohms per thousand feet in water, an original dielectric strength of 650 volts per mil, and after immersion in water at 25° C., a dielectric strength of 162 volts per mil. The power factor at 1000 cycles is 1.16 and at 1,000,000 cycles 1.31. After being exposed to ultra-violet radiation for 300 hours, the power factor at 1000 cycles is 1.08 and at 1,000,000 cycles 1.66.

Other modes of applying the principle of our invention may be employed instead of the one explained, change being made as regards the materials employed, provided the ingredients stated by any of the following claims or the equivalent of such stated ingredients be employed.

We therefore particularly point out and distinctly claim as our invention:

1. A composition comprising a cellulose derivative and a compound having the general formula

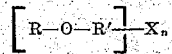

wherein R and R' are each aryl groups selected from the class consisting of the phenyl, alkyl phenyl, aralkyl phenyl, diphenyl, and naphthyl radicals, and their halogen substitution products, X is a hydroaromatic radical selected from the group consisting of the cyclohexyl, dicyclohexyl, alkyl cyclohexyl, and aryl cyclohexyl groups, and $n$ is a numeral from 1 to 6, inclusive, such that the mol ratio of hydroaromatic radicals to aryl ether residues is greater than 1.5/1.

2. A molding composition comprising a cellulose derivative plasticized with from 5 to 40 parts, per 100 parts of the cellulose derivative, of at least one compound having the general formula $$\left[ R-O-R' \right]-X_n$$

wherein R and R' are each aryl groups selected from the class consisting of the phenyl, alkyl phenyl, aralkyl phenyl, diphenyl, and naphthyl radicals, and their halogen substitution products, X is a hydroaromatic radical selected from the group consisting of the cyclohexyl, dicyclohexyl, alkyl cyclohexyl and aryl cyclohexyl groups, and $n$ is a numeral from 1 to 6, inclusive, such that the mol ratio of hydroaromatic radicals to aryl ether residues is greater than 1.5/1.

3. A composition of matter comprising a cellulose derivative plasticized with from 5 to 40 parts, per 100 parts of the cellulose derivative, of at least one compound having the general formula $$\left[ R-O-R' \right]-X_n$$

wherein R and R' are each aryl groups selected from the class consisting of the phenyl, alkyl phenyl, aralkyl phenyl, diphenyl, and naphthyl radicals, and their halogen substitution products, X is a hydroaromatic radical selected from the group consisting of the cyclohexyl, dicyclohexyl, alkyl cyclohexyl, and aryl cyclohexyl groups, and $n$ is a numeral from 1 to 6, inclusive, such that the mol ratio of hydroaromatic radicals to aryl ether residues is greater than 1.5/1, said composition when in film form being characterized by its flexibility, toughness, and improved dielectric properties as compared with those of the unplasticized cellulose derivative.

4. A composition of matter comprising a cellulose derivative plasticized with about 15 parts, per 100 parts of the cellulose derivative, of at least one compound having the general formula $$\left[ R-O-R' \right]-X_n$$

wherein R and R' are each aryl groups selected from the class consisting of the phenyl, alkyl phenyl, aralkyl phenyl, diphenyl, and naphthyl radicals, and their halogen substitution products, X is a hydroaromatic radical selected from the group consisting of the cyclohexyl, dicyclohexyl, alkyl cyclohexyl and aryl cyclohexyl groups, and $n$ is a numeral from 1 to 6, inclusive, such that the mol ratio of hydroaromatic radicals to aryl ether residues is greater than 1.5/1, the said composition having a hardness index at least 75 per cent as great as that of the cellulose derivative alone.

5. A composition of matter comprising a cellulose ether and at least one compound having the general formula $$\left[ R-O-R' \right]-X_n$$

wherein R and R' are each aryl groups selected from the class consisting of the phenyl, alkyl phenyl, aralkyl phenyl, diphenyl, and naphthyl radicals, and their halogen substitution products, X is a hydroaromatic radical selected from the group consisting of the cyclohexyl, dicyclohexyl, alkyl cyclohexyl, and aryl cyclohexyl groups, and $n$ is a numeral from 1 to 6, inclusive, such that the mol ratio of hydroaromatic radicals to aryl ether residues is greater than 1.5/1.

6. A composition of matter comprising a cellulose ester and at least one compound having the general formula $$\left[ R-O-R' \right]-X_n$$

wherein R and R' are each aryl groups selected from the class consisting of the phenyl, alkyl phenyl, aralkyl phenyl, diphenyl, and naphthyl radicals, and their halogen substitution products, X is a hydroaromatic radical selected from the group consisting of the cyclohexyl, dicyclohexyl, alkyl cyclohexyl, and aryl cyclohexyl groups, and $n$ is a numeral from 1 to 6, inclusive, such that the mol ratio of hydroaromatic radicals to aryl ether residues is greater than 1.5/1.

7. A composition of matter comprising ethyl cellulose and at least one compound having the general formula $$\left[ R-O-R' \right]-X_n$$

wherein R and R' are each aryl groups selected from the class consisting of the phenyl, alkyl phenyl, aralkyl phenyl, diphenyl, and naphthyl radicals, and their halogen substitution products, X is a hydroaromatic radical selected from the group consisting of the cyclohexyl, dicyclohexyl, alkyl cyclohexyl, and aryl cyclohexyl groups, and $n$ is a numeral from 1 to 6, inclusive, such that the mol ratio of hydroaromatic radicals to aryl ether residues is greater than 1.5/1.

8. A composition of matter comprising a cellulose derivative and at least one cyclohexylated phenyl ether wherein the number of cyclohexyl groups is from 1 to 6, inclusive, the mol ratio of cyclohexyl groups to phenyl ether residues being greater than 1.5/1.

9. A composition of matter comprising ethyl cellulose and at least one cyclohexylated phenyl ether wherein the number of cyclohexyl substituents is from 1 to 6, inclusive, the mol ratio of cyclohexyl groups to phenyl ether residues being greater than 1.5/1.

10. A composition of matter comprising benzyl cellulose and plasticizing quantities of at least one cyclohexylated phenyl ether wherein the number of cyclohexyl substituents is from 1 to 6, inclusive, the mol ratio of cyclohexyl groups to phenyl ether residues being greater than 1.5/1.

SHAILER L. BASS.
TOIVO A. KAUPPI.
FRANK B. SMITH.